United States Patent [19]

Lindberg et al.

[11] 4,059,683

[45] Nov. 22, 1977

[54] DECOMPOSITION OF HALOGENATED ORGANIC COMPOUNDS

[75] Inventors: Robert C. Lindberg; James D. Reedy; Kang Yang, all of Ponca City, Okla.

[73] Assignee: Continental Oil Company, Ponca City, Okla.

[21] Appl. No.: 696,169

[22] Filed: June 14, 1976

Related U.S. Application Data

[63] Continuation-in-part of Ser. No. 679,429, April 22, 1976, abandoned.

[51] Int. Cl.$^2$ ............................ C01B 7/08; C01B 7/00
[52] U.S. Cl. ................................... 423/481; 423/240; 423/502
[58] Field of Search .................... 423/481, 488, 502

[56] References Cited

U.S. PATENT DOCUMENTS

| 2,340,610 | 2/1944 | Musket et al. | 423/613 |
| 3,120,427 | 2/1964 | Mas et al. | 423/613 |
| 3,705,010 | 12/1972 | Davis et al. | 423/502 |
| 3,972,979 | 8/1976 | Kageyama | 423/502 X |

OTHER PUBLICATIONS

J. Appl. Chem. Biotechnol, 1975, 25, pp. 241–248.

*Primary Examiner*—Edward Stern
*Attorney, Agent, or Firm*—Bayless E. Rutherford, Jr.

[57] ABSTRACT

A method for decomposing halogenated organic compounds which comprises: (a) preheating the halogenated organic compound to a temperature above about 300° C. and (b) contacting the preheated organic compound with a platinum catalyst in the presence of an oxidizing agent at a temperature of at least 350° C. The process converts the major part of the halide in the organic halide to hydrogen halide.

12 Claims, No Drawings

DECOMPOSITION OF HALOGENATED ORGANIC COMPOUNDS

CROSS-REFERENCE TO RELATED APPLICATIONS

This application is a continuation-in-part of application Ser. No. 679,429, filed Apr. 22, 1976 now abandoned.

FIELD OF THE INVENTION

Briefly, the invention is in the field of decomposing halogenated organic compounds. More specifically, the invention is in the field of removal of vinyl halides (e.g., by the decomposition thereof) from gas streams.

BACKGROUND

Polyvinylchloride, which is prepared by the polymerization of vinyl chloride, is one of the most useful of modern commercial plastics. Unfortunately, it is now believed to be well-established that vinyl chloride in sufficient concentration is harmful. In view of this, extensive research is now being conducted on methods of decomposing, or removing, vinyl chloride. Our invention is directed to a method for decomposing a vinyl halide, such as vinyl chloride. More specifically, our invention is directed to a method of decomposing a vinyl halide, such as vinyl chloride, when present in an oxygen-containing gas stream such as air.

While decomposition of vinyl chloride is an important use for our method, it is readily apparent that the method is also useful for decomposing other halogenated organic compounds, as defined hereinafter.

Prior Art

Based on searches in the general area of decomposing vinyl chloride, in the opinion of the agent preparing this application, the most pertinent art is believed to be the following.

An article by Bond and Sadeghi (J. Appl. Chem., Biotechnol, 25, 241 (1975)) teaches the catalytic destruction of chlorinated hydrocarbons using a Pt-alumina catalyst. The article teaches that a hydrocarbon fuel is required for those molecules containing more chlorine atoms than hydrogen atoms. However, all of the examples in the article use a hydrocarbon fuel. Moreover, the article contains no teachings of preheating the feedstock prior to passing it through the reactor.

The catalytic cleavage of ethyl chloride by platinum metal is described by the following references:

Dokl. Akad. Nank SSSR 200 1105-b (1971) C.A. 76:14867 u

Chemiker Ztz 88, 15-16 (1964) C.A. 60:7503 b

However, the following art teaches that halogen-containing compounds are poisonous to platinum oxidation catalysts:

"Industrial Pollution Control Handbook" edited by H. F. Lund, McGraw-Hill, 1971, Chapters 5, 7, and 14.

In summary, the art does not teach the advantages obtained by preheating the feedstock as described by Applicants' invention.

BRIEF SUMMARY OF THE INVENTION

Broadly stated, the present invention is directed to a method for decomposing halogenated organic compounds wherein the method comprises:

a. heating the halogenated organic compound to a temperature above about 300° C.

b. contacting the heated organic compound with a platinum catalyst in the presence of an oxidizing agent at a temperature of at least 350° C.

In one aspect, the present invention is directed to a method for decomposing halogenated organic compounds, wherein the method comprises:

a. heating a gaseous stream comprising said halogenated organic compounds and an oxidizing gas to a temperature above about 300° C., b. passing the heated gaseous stream of step (a) through a heated zone wherein it contacts a platinum catalyst, at a temperature of at least 350° C., said process being characterized further in that said halogenated organic compound and said oxidizing gas are the only reactive components.

In a preferred embodiment, the halogenated organic compound is vinyl chloride and the oxidizing gas is air or a mixture of nitrogen and oxygen.

DETAILED DESCRIPTION

Materials

Suitable halogenated organic compounds for use in our process are those containing 1 to 4 carbon atoms and containing at least as many hydrogen atoms as halogen atoms. Also suitable are mixtures of halogenated organic compounds containing 1 to 4 carbon atoms wherein the total number of hydrogen atoms in the mixture is at least equal to the total number of halogen atoms. Particularly suitable halogenated organic compounds are unsaturated organic compounds such as the vinyl halides and mixtures of $C_1$ halogenated compounds and $C_2$ halogenated compounds containing vinyl halides, wherein in said mixtures the total number of hydrogen atoms is at least equal to the total number of halogen atoms. The preferred halogenated organic compounds are those wherein the halogen is chlorine. Using chlorine as a typical halogen, examples of suitable halogenated organic compounds are materials represented by the formulae $CH_3Cl$, $CH_2Cl_2$, $CH_3CHCl_2$, $CH_2Cl\ CH_2Cl$, $CH_2=CHCl$, $CH_3CH=CHCl$, $CH_3CH_2CH=CHCl$.

From the foregoing description, it is understood that the halogenated organic compounds contain only carbon, hydrogen, and halogen.

The catalyst employed in the method of this invention is platinum. The platinum may be in the form of finely divided metallic platinum or in the form of platinum coated or impregnated on a non-oxidizing carrier as a support. Generally, any of the non-oxidizing carriers normally employed with noble metal catalysts may be used. Alumina is particularly desirable although $SiO_2$, $SiC$, $Fe_2O_3$ and kieselguhr including diatomaceous earth are also desirable. Platinum impregnated on an alumina carrier support is the preferred catalyst form.

These catalytic forms of platinum are readily available through commercial sources and are well known in the art. In particular, the supported forms of the catalyst are conventionally used in petroleum reforming processes. These catalysts contain from 0.1 to 1.0%, more usually from 0.4 to 0.6%, by weight of platinum. In addition, they usually contain a small amount (e.g., 0.1 to 0.3%) of halogen such as chlorine.

The following U.S. patents, which are made a part of this disclosure, teach methods of preparing suitable platinum catalysts: Nos. 2,898,289; 2,909,481; and 2,940,924.

A typical example of a suitable catalyst is "Houdry 3K" catalyst which is available from Air Products and Chemicals. This catalyst has the following properties:

Pt, wt. % — 0.5–0.6
Cl, wt. % — 0.2
Bulk density — 0.64–0.69 g/cc
Surface area — 250 sq. meters/gm.
Form — 1.6–3.2 mm. extrudate Suitable oxidizing gases include air, oxygen, and mixtures of nitrogen and oxygen.

Process Conditions

An important feature of our process is heating the halogenated organic compound prior to passing it into the reactor zone where it is contacted with the catalyst. The oxidation of the halogenated organic compound in the presence of the catalyst is exothermic but does not proceed spontaneously. In order that the reaction occur when contacted with catalyst, it is necessary to have the halogenated organic compound at some minimum elevated temperature before contacting with the catalyst. (Persons skilled in this art often call this step "preheating.") This particular heating step should be conducted using a temperature above about 300° C. more suitably above 320° C., and preferably above 340° C. The maximum temperature for this heating step is about 600° C., preferably about 500° C.

We have found that this preheating improves the life of the catalyst and provides a more efficient decomposition of the halogenated organic compound. Moreover, it has been found that attempts to conduct the process by simply heating the reactants to the necessary temperatures in the reaction zone without preheating results in the catalyst being quickly rendered ineffective due to deposition of carbon and carbon-containing compounds. This is particularly true when vinyl chloride is the halogenated organic compound being decomposed.

The heated halogenated organic compound is then passed to a reaction zone containing the catalyst. Since the reaction is exothermic, the temperature in the reaction zone varies, with the highest temperature suitably being in the range of about 350° to about 600° C., preferably in the range of about 400° to about 500° C. (The highest temperature in the reaction zone is often referred to as "hot spot" temperature).

Our process is particularly suitable for use with air (or a mixture of nitrogen and oxygen) containing the halogenated organic compound (e.g., vinyl chloride) wherein the halogenated organic compound can be present over a wide range. In order to provide a more specific teaching, the GHSV (gas hourly space velocity) of gas including halogenated organic compound to catalyst can be in the range of 100 to 100,000 l/hr.

While it is believed to be implied from the foregoing, it may be well to state that our invention is also applicable to processes wherein liquid halogenated organic compounds are vaporized and injected into the oxidizing gas.

Our process has the particular advantage that over 99% of the halogen in the halogenated organic compound is converted to hydrogen halide. This is advantageous in that hydrogen halide is more readily absorbed in water than is halogen gas.

Our process has the further advantage that additional hydrocarbons are not required as fuel in order to convert the halogen to a hydrogen halide.

Usually the effluent from the reactor is passed through a scrubber in order to absorb the hydrogen halide decomposition product.

In order to illustrate the nature of the present invention still more clearly, the following examples will be given. It is to be understood, however, that the invention is not to be limited to the specific conditions or details set forth in these examples except insofar as such limitations are specified in the appended claims.

In the following examples, the reactor, which was a 11 cm. length of 1.3 cm. diameter stainless steel tube with 3.2 mm. thermocouple axially placed therein, was placed in a Lindburg furnace. A preheater, 20 cm. long 1.3 cm diameter stainless steel tube, preceded the reactor.

Five cc. of Houdry 3K reforming catalyst was placed in the reactor and occupied 7 cm. length of the reactor. This catalyst was 1.6 mm. extrudates and contained 0.6% Pt and 0.2% Cl impregnated on alumina.

The feed gas composition was as follows v/o: $N_2$ - 86.8; $O_2$ - 11.2; $C_2H_5Cl$ - 1.7; $C_2H_3Cl$ - 0.13; $ClC_2H_4Cl$ - 0.079; $Cl_2$ - 0.079; $CHCl_3$ - 0.033; $CCl_4$ - 0.018.

The composition of outlet gas was analyzed chromatographically using a flame ionization detector.

In all cases, the figure given for the reactor temperature is the highest temperature in the reactor zone.

EXAMPLE 1

This example shows the results of a series of runs wherein the preheater temperature was 322° C. and the space velocity and reactor temperature were varied. The results were as follows:

| Space Velocity hr$^{-1}$ | Reactor Temperature (° C) | [RCl][(1)] Total (ppmv) |
|---|---|---|
| 1440 | 357 | 0.2 |
| 2400 | 396 | 0.2 |
| 3600 | 415 | 0.2 |
| 4800 | 437 | 0.2 |

[(1)]RCl = alkyl and alkylene chlorides

In the outlet gas, the $COCl_2$ was less than 1 ppmv and the percent of chloride ending up as $Cl_2$ was less than 0.2%.

EXAMPLE 2

In a series of runs, the preheater temperature was 300° C. or below. The reactor temperature was 357 ° C. and the space velocity was 2400 hr$^{-1}$. The concentration of RCl in the outlet gas was above 10 ppmv in all runs thereby indicating that the catalyst was losing its effectiveness.

EXAMPLE 3

This run was made using the following conditions:

Preheater Temperature — 322° C.
Reactor Temperature — 375°–550° C
Space Velocity — 2400 hr$^{-1}$ The total concentration of RCl was below 0.2 ppmv.

EXAMPLE 4

This example illustrates the effect of preheater temperature on catalyst life.

At a space velocity of 2400 hr$^{-1}$ and a preheater temperature of 343° C., the total RCl concentration was below 0.2 ppmv after 240 hours of continuous operation at various conditions during which the catalyst underwent deactivation several times by either keeping the preheater below 300° C. or using less than stoichiometric amount of air.

The reactor temperature was between 357°-437° C. during this run.

In the following examples larger apparatus was used.

The reactor was 33 cm. of 2.7 cm. diameter stainless steel pipe containing a 3.2 mm. thermowell along the pipe centerline. The preheater was comprised at a coil of 1.3 cm. tubing enclosed in an electrically heated furnace.

Electrical heating tapes were placed around the line from preheater to reactor and reactor itself to control their respective temperatures.

The reactor contained 170 cc. of Houdry 3K reforming catalyst, 0.6% Pt and 0.2% Cl inpregnated on alumina.

The feed gas had the following composition v/o:

vinyl chloride — 0.2 to 0.6
nitrogen — about 96
oxygen — about 3.8

The composition of the reactor outlet gas was determined using chromatographic analysis with a flame ionization detector.

The chlorine determination was made using a conventional method.

EXAMPLE 5

A series of runs was made wherein the space velocity, preheater temperature and reactor temperature were varied. The results are shown below.

| Space Velocity hr$^{-1}$ | Preheater Temperature, °C | Reactor Temperature, °C | Vinyl Chloride (ppmv) |
|---|---|---|---|
| 4,000 | 388 | 446 | 0.2 |
| 4,000 | 396 | 427 | 0.5 |
| 4,000 | 388 | 418 | 0.7 |
| 4,000 | 390 | 404 | 0.8 |
| 5,000 | 398 | 443 | 1.0 |
| 5,000 | 388 | 418 | 0.6 |
| 5,300 | 388 | 402 | 0.8 |
| 5,600 | 396 | 427 | 0.3 |
| 6,000 | 412 | 415 | 0.8 |

EXAMPLE 6

This example shows the effect of using a reactor temperature less than 400° C. in this size reactor.

The space velocity was 5,000 hr$^{-1}$.

The preheater temperature, reactor temperature and vinyl chloride content for five runs are shown below.

| Preheater Temperature, °C. | Reactor Temperature, °C. | Vinyl Chloride (ppmv) |
|---|---|---|
| 398 | 443 | 1.0 |
| 388 | 418 | 0.6 |
| 388 | 407 | 4.2 |
| 387 | 387 | 280 |
| 376 | 376 | 500 |

EXAMPLE 7

This example shows the effect of preheater temperature.

The space velocity was 5,000 hr$^{-1}$ in both runs. Run A — Using a preheater temperature of 300° C., the reactor temperature reached only 310° C., indicating no reaction was occurring. The concentration of vinyl chloride in the outlet gas was 2,000 ppmv which was about the same as that of the feed gas. This further indicated that no reaction occurred. Run B — Using a preheater temperature of 330° C. the temperature in the reactor reached 465° C. The concentration of vinyl chloride in the outlet gas was in the range of 0.3 to 1.4 ppmv.

This example clearly illustrates the improvement of Applicant's invention. It shows that without added hydrogen fuel the reaction needs a preheater temperature above 300° C.

EXAMPLE 8

This example shows that the catalyst has a long life in our method.

The preheater temperature was in the range of 391° to 413° C.

The reactor temperature was in the range of 425° to 458° C.

After 224 hours of operation at space velocities in the range of 4,000 to 6,000 hr$^{-1}$, the concentration of vinyl chloride in the outlet gas was less than 1 ppmv.

Thus, having described the invention in detail, it will be understood by those skilled in the art that certain variations and modifications may be made without departing from the spirit and scope of the invention as defined herein and in the appended claims.

We claim:

1. A method for decomposing halogenated organic compounds said halogenated organic compounds containing 1 to 4 carbon atoms and containing at least as many hydrogen atoms as halogen atoms, said method comprising:
    a. heating the halogenated organic compounds to a temperature in the range of above about 300° C. to about 500° C., and,
    b. then contacting the heated organic compounds with a catalyst, which is platinum-impregnated on a nonoxidizing carrier, in the presence of an oxidizing agent and in the absence of added hydrocarbons at a temperature, which is at least 350° C. and is higher than the temperature of step (a),
    said method being characterized further in that at least 99% of the halogen present in the halogenated organic compounds is converted to hydrogen halides.

2. A method for decomposing halogenated organic compounds said halogenated organic compounds containing 1 to 4 carbon atoms and containing at least as many hydrogen atoms as halogen atoms said method comprising:
    a. heating a gaseous stream comprising said halogenated organic compounds and an oxidizing gas selected from air and a mixture of nitrogen and air to a temperature in the range of above about 300° C. to about 500° C. and,
    b. passing the heated gaseous stream of step (a) to a heated zone wherein it contacts a catalyst, which is platinum-impregnated on a nonoxidizing carrier, at a temperature which is at least 350° C. and is higher than the temperature of step (a),
    said method being characterized further in that (a) at least 99% of the halogen present in the halogenated organic compounds is converted to hydrogen halides and (b) said halogenated organic compounds and said oxidizing gas are the only reactive materials.

3. The process of claim 1 wherein the oxidizing agent is air or a mixture of nitrogen and oxygen.

4. The process of claim 3 wherein the halogenated organic compounds are selected from the group consisting of vinyl halides and mixtures of $C_1$ halogenated compounds and $C_2$ halogenated compounds containing vinyl halides wherein the total number of hydrogen atoms in the mixture is at least equal to the total number of halogen atoms.

5. The process of claim 4 wherein the halogen of said halogenated organic compounds is chlorine.

6. The process of claim 5 wherein the temperature in step (a) is above 320° C and the temperature is step (b) is in the range of about 350° C to about 600° C.

7. The process of claim 6 wherein the temperature of step (a) is above 340° C. and the temperature of step (b) is in the range of about 400° C. to about 500° C.

8. The process of claim 2 wherein the halogenated organic compounds are selected from the group consisting of vinyl halides and mixtures of $C_1$ halogenated compounds and $C_2$ halogenated compounds containing vinyl halides wherein the total number of hydrogen atoms in the mixture is at least equal to the total number of halogen atoms.

9. The process of claim 8 wherein the halogen of said halogenated organic compounds is chlorine.

10. The process of claim 9 wherein the temperature in step (a) is above 320° C. and the temperature in step (b) is in the range of about 350° C. to about 600° C.

11. The process of claim 10 wherein the temperature in step (a) is above 340° C. and the temperature in step (b) is in the range of about 400° C. to about 500° C.

12. The process of claim 11 wherein the nonoxidizing carrier is alumina.

* * * * *